United States Patent
Wen et al.

(10) Patent No.: US 11,621,803 B2
(45) Date of Patent: Apr. 4, 2023

(54) HYBRID AUTOMATIC REPEAT REQUEST IN NON-TERRESTRIAL NETWORKS

(71) Applicant: Nokia Technologies Oy, Espoo (FI)

(72) Inventors: Pingping Wen, Shanghai (CN); Karri Ranta-aho, Espoo (FI); Zhilan Xiong, Bristol (GB); Tao Yang, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 17/056,960

(22) PCT Filed: May 21, 2018

(86) PCT No.: PCT/CN2018/087681
§ 371 (c)(1),
(2) Date: Nov. 19, 2020

(87) PCT Pub. No.: WO2019/222881
PCT Pub. Date: Nov. 28, 2019

(65) Prior Publication Data
US 2021/0314092 A1    Oct. 7, 2021

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/1887* (2013.01); *H04W 72/042* (2013.01)

(58) Field of Classification Search
CPC ... H04W 28/04; H04W 72/04; H04W 72/042; H04W 88/08; H04L 5/0007; H04L 1/1812; H04L 1/1887
(Continued)

(56) References Cited

U.S. PATENT DOCUMENTS 10,069,613 B2 * 9/2018 Nory ................ H04W 72/1284
2012/0300733 A1 * 11/2012 Pelletier ................ H04L 5/0005
370/329
(Continued)

FOREIGN PATENT DOCUMENTS

JP  WO-2017135036 A1 * 8/2017 ............. H04W 4/40
WO  2012/139291 A1   10/2012
(Continued)

OTHER PUBLICATIONS

3GPP TSG-RAN WG1 Meeting #89, Hangzhou, P.R. China, May 15-19, 2017, R1-1708185, Agenda item: 6.2.1.1.4, Source: Nokia, Alcatel-Lucent Shanghai Bell, Title: On asynchronous UL HARQ for 1 ms TTI. (Year: 2017).*
(Continued)

*Primary Examiner* — Peter G Solinsky
*Assistant Examiner* — Sanjay K Dewan
(74) *Attorney, Agent, or Firm* — Joseph C. Drish; Harrington & Smith (57) ABSTRACT

Various communication systems may benefit from improved HARQ. For example, it may be helpful to improve HARQ in non-terrestrial networks. A method may include receiving at a user equipment a configuration from a network entity. The configuration may include a hybrid automatic repeat request virtual process number. The method may also include receiving at the user equipment a downlink control information from the network entity. The downlink control information may include a hybrid automatic repeat request virtual process identification. In addition, the method may include receiving at the user equipment another downlink control information. The another downlink control information may include the hybrid automatic repeat request virtual process identification. Further, the method may include determining at the user equipment a difference between a timing of a transmission indicated by the downlink control information and another timing of another transmission indicated by the another downlink control information.

20 Claims, 5 Drawing Sheets

(51) Int. Cl.
*H04L 1/1812* (2023.01)
*H04L 1/1867* (2023.01)

(58) Field of Classification Search
USPC .......................................................... 370/329
See application file for complete search history.

(56) References Cited

U.S. PATENT DOCUMENTS

2017/0332365 A1* 11/2017 Lin ...................... H04L 5/0091
2022/0109496 A1* 4/2022 Shrestha ............ H04B 7/18519

FOREIGN PATENT DOCUMENTS

| WO | 2017/172789 A1 | 10/2017 | |
| WO | WO 2017172789 A1 * | 10/2017 | ............ H04W 72/12 |
| WO | 2018/064367 A1 | 4/2018 | |
| WO | WO 2018064367 A1 * | 4/2018 | ............ H04W 74/00 |

OTHER PUBLICATIONS

3GPP TSG RAN WG1 Meeting #92 bis, Sanya, China, Apr. 16-20, 2018, R1-1804857, Agenda item: 7.3.2, Source: InterDigital Inc., Title: Deactivating HARQ for Non-Terrestrial Networks. (Year: 2018).*

Extended European Search Report received for corresponding European Patent Application No. 18920156.9, dated Dec. 21, 2021, 8 pages.

"On asynchronous UL HARQ for 1ms TTI", 3GPP TSG-RAN WG1 Meeting #89, R1-1708185, Agenda : 6.2.1.1.4, Nokia, May 15-19, 2017, 6 pages.

Office action received for corresponding Indian Patent Application No. 202047054157, dated Dec. 22, 2021, 7 pages.

"3rd Generation Partnership Project; Technical Specification Group Radio Access Network; NR; Physical layer procedures for control (Release 15)", 3GPP TS 38.213, V15.1.0, Mar. 2018, pp. 1-77.

"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.

"Deactivating HARQ for Non-Terrestrial Networks", 3GPP TSG RAN WG1 Meeting #92bis, R1-1804857, Agenda : 7.3.2, InterDigital Inc., Apr. 16-20, 2018, pp. 1-3.

"3rd Generation Partnership Project; Technical Specification Group Radio Access Network; NR; Physical layer procedures for data (Release 15)", 3GPP TS 38.214, V15.1.0, Mar. 2018, pp. 1-77.

International Search Report and Written Opinion received for corresponding Patent Cooperation Treaty Application No. PCT/CN2018/087681, dated Jan. 24, 2019, 10 pages.

* cited by examiner

HYBRID AUTOMATIC REPEAT REQUEST IN NON-TERRESTRIAL NETWORKS

RELATED APPLICATION

This application claims priority to PCT Application No. PCT/CN2018/087681, filed on May 21, 2018, of which is incorporated herein by reference in its entirety.

BACKGROUND

Field

Various communication systems may benefit from improved Hybrid Automatic Repeat Request (HARQ). For example, it may be helpful to improve HARQ in non-terrestrial networks.

Description of the Related Art

Third generation partnership project (3GPP) technology, as well as other type of network communication technology, are capable of supporting both terrestrial and non-terrestrial networks. Terrestrial networks are networks that utilize ground-based network nodes and relay nodes to transmit information throughout the network. On the other hand, non-terrestrial networks use airborne or space-borne vehicles to facilitate signal transmissions throughout the network. Space-borne vehicles, for example, may be satellites, such as Low Earth Orbiting (LEO) satellites, Medium Earth Orbiting (MEO) satellites, Geostationary Earth Orbiting (GEO) satellites, or Highly Elliptical Orbiting (HEO) satellites. Some communication networks may utilize both terrestrial and non-terrestrial technology together. That is, one part of the network may utilize ground based signal transmission, while the other part of the network may utilize airborne or space-borne vehicles for signal transmission.

Using Fifth Generation (5G) or New Radio (NR) technology in a non-terrestrial network may impact HARQ design. Specifically, using 5G or NR radio access for satellite links in a non-terrestrial network can cause long round trip delays, which impact HARQ procedures. HARQ is a combination of high-rate forward error-correcting coding and automatic repeat request error-control, which enhances communication performance through retransmission of data received in error.

SUMMARY

According to certain embodiments, an apparatus may include at least one memory including computer program code, and at least one processor. The at least one memory and the computer program code may be configured, with the at least one processor, to cause the apparatus at least to receive a configuration from a network entity. The configuration may include a hybrid automatic repeat request virtual process number. The at least one memory and the computer program code may also be configured, with the at least one processor, to cause the apparatus at least to receive a downlink control information from the network entity. The downlink control information may include a hybrid automatic repeat request virtual process identification. In addition, the at least one memory and the computer program code may be configured, with the at least one processor, to cause the apparatus at least to receive at the user equipment another downlink control information. The another downlink control information may comprises the hybrid automatic repeat request virtual process identification. Further, the at least one memory and the computer program code may be configured, with the at least one processor, to cause the apparatus at least to determine a difference between a timing of a transmission indicated by the downlink control information and another timing of another transmission indicated by the another downlink control information.

According to certain embodiments, a method may include receiving at a user equipment a configuration from a network entity. The configuration may include a hybrid automatic repeat request virtual process number. The method may also include receiving at the user equipment a downlink control information from the network entity. The downlink control information may include a hybrid automatic repeat request virtual process identification. In addition, the method may include receiving at the user equipment another downlink control information. The another downlink control information may include the hybrid automatic repeat request virtual process identification. Further, the method may include determining at the user equipment a difference between a timing of a transmission indicated by the downlink control information and another timing of another transmission indicated by the another downlink control information.

An apparatus, in certain embodiments, may include means for receiving at a user equipment a configuration from a network entity. The configuration may include a hybrid automatic repeat request virtual process number. The apparatus may also include means for receiving at the user equipment a downlink control information from the network entity. The downlink control information may include a hybrid automatic repeat request virtual process identification. In addition, the apparatus may include means for receiving at the user equipment another downlink control information. The another downlink control information may include the hybrid automatic repeat request virtual process identification. Further, the apparatus may include means for determining at the user equipment a difference between a timing of a transmission indicated by the downlink control information and another timing of another transmission indicated by the another downlink control information.

According to certain embodiments, a non-transitory computer-readable medium encoding instructions that, when executed in hardware, perform a process. The process may include receiving at a user equipment a configuration from a network entity. The configuration may include a hybrid automatic repeat request virtual process number. The process may also include receiving at the user equipment a downlink control information from the network entity. The downlink control information may include a hybrid automatic repeat request virtual process identification. In addition, the process may include receiving at the user equipment another downlink control information. The another downlink control information may include the hybrid automatic repeat request virtual process identification. Further, the process may include determining at the user equipment a difference between a timing of a transmission indicated by the downlink control information and another timing of another transmission indicated by the another downlink control information.

According to certain other embodiments, a computer program product may encode instructions for performing a process. The process may include receiving at a user equipment a configuration from a network entity. The configuration may include a hybrid automatic repeat request virtual process number. The process may also include receiving at the user equipment a downlink control information from the network entity. The downlink control information may include a hybrid automatic repeat request virtual process identification. In addition, the process may include receiving at the user equipment another downlink control information. The another downlink control information may include the hybrid automatic repeat request virtual process identification. Further, the process may include determining at the user equipment a difference between a timing of a transmission indicated by the downlink control information and another timing of another transmission indicated by the another downlink control information.

An apparatus, according to certain embodiments, may include circuitry for receiving at a user equipment a configuration from a network entity. The configuration may include a hybrid automatic repeat request virtual process number. The apparatus may also include circuitry for receiving at the user equipment a downlink control information from the network entity. The downlink control information may include a hybrid automatic repeat request virtual process identification. In addition, the apparatus may include circuitry for receiving at the user equipment another downlink control information. The another downlink control information may include the hybrid automatic repeat request virtual process identification. Further, the apparatus may include circuitry for determining at the user equipment a difference between a timing of a transmission indicated by the downlink control information and another timing of another transmission indicated by the another downlink control information.

According to certain embodiments, an apparatus may include at least one memory including computer program code, and at least one processor. The at least one memory and the computer program code may be configured, with the at least one processor, to cause the apparatus at least to configure a HARQ virtual process number for a user equipment. The at least one memory and the computer program code may also be configured, with the at least one processor, to cause the apparatus at least to schedule an asynchronous HARQ retransmission during a timing of the virtual process number. In addition, the at least one memory and the computer program code may be configured, with the at least one processor, to cause the apparatus at least to transmit DCI to the user equipment, where the DCI comprises a HARQ virtual process identification.

According to certain embodiments, a method may include configuring a HARQ virtual process number for a user equipment. The method may also include scheduling an asynchronous HARQ retransmission during a timing of the virtual process number. In addition, the method may include transmitting DCI to the user equipment, wherein the DCI comprises a HARQ virtual process identification.

An apparatus, in certain embodiments, may include means for configuring a HARQ virtual process number for a user equipment. The apparatus may also include means for scheduling an asynchronous HARQ retransmission during a timing of the virtual process number. In addition, the apparatus may include means for transmitting DCI to the user equipment, wherein the DCI comprises a HARQ virtual process identification.

According to certain embodiments, a non-transitory computer-readable medium encoding instructions that, when executed in hardware, perform a process. The process may include configuring a HARQ virtual process number for a user equipment. The process may also include scheduling an asynchronous HARQ retransmission during a timing of the virtual process number. In addition, the process may include transmitting DCI to the user equipment, wherein the DCI comprises a HARQ virtual process identification.

According to certain other embodiments, a computer program product may encode instructions for performing a process. The process may include configuring a HARQ virtual process number for a user equipment. The process may also include scheduling an asynchronous HARQ retransmission during a timing of the virtual process number. In addition, the process may include transmitting DCI to the user equipment, wherein the DCI comprises a HARQ virtual process identification.

An apparatus, according to certain embodiments, may include circuitry for configuring a HARQ virtual process number for a user equipment. The apparatus may also include circuitry for scheduling an asynchronous HARQ retransmission during a timing of the virtual process number. In addition, the apparatus may include circuitry for transmitting DCI to the user equipment, wherein the DCI comprises a HARQ virtual process identification.

According to certain embodiments, an apparatus may include at least one memory including computer program code, and at least one processor. The at least one memory and the computer program code may be configured, with the at least one processor, to cause the apparatus at least to map a logical channel to a carrier. The at least one memory and the computer program code may also be configured, with the at least one processor, to cause the apparatus at least to disable a hybrid automatic repeat request on the carrier or the logical channel based on a quality of service requirement of the logical channel.

According to certain embodiments, a method may include mapping at a user equipment a logical channel to a carrier. The method may also include disabling at the user equipment a hybrid automatic repeat request on the carrier or the logical channel based on a quality of service requirement of the logical channel.

An apparatus, in certain embodiments, may include means for mapping a logical channel to a carrier. The apparatus may also include means for disabling a hybrid automatic repeat request on the carrier or the logical channel based on a quality of service requirement of the logical channel.

According to certain embodiments, a non-transitory computer-readable medium encoding instructions that, when executed in hardware, perform a process. The process may include mapping at a user equipment a logical channel to a carrier. The process may also include disabling at the user equipment a hybrid automatic repeat request on the carrier or the logical channel based on a quality of service requirement of the logical channel.

According to certain other embodiments, a computer program product may encode instructions for performing a process. The process may include mapping at a user equipment a logical channel to a carrier. The process may also include disabling at the user equipment a hybrid automatic repeat request on the carrier or the logical channel based on a quality of service requirement of the logical channel.

An apparatus, according to certain embodiments, may include circuitry for mapping a logical channel to a carrier. The apparatus may also include circuitry for disabling a hybrid automatic repeat request on the carrier or the logical channel based on a quality of service requirement of the logical channel.

BRIEF DESCRIPTION OF THE DRAWINGS

For proper understanding of the invention, reference should be made to the accompanying drawings, wherein.

DETAILED DESCRIPTION

A number of HARQ processes, $N_{HARQ}$, may be determined using the following equation:

$$N_{HARQ} = \left\lceil \frac{T_{sf} + T_{ue} + T_{ack} + T_{nb} + RTT}{T_{sf}} \right\rceil.$$

RTT may represent round trip time, $T_{sf}$ may represent subframe duration, $T_{ue}$ may represent a user equipment processing time, $T_{ack}$ may represent acknowledgement or negative acknowledgement transmission time, and $T_{nb}$ may represent a network entity processing time. The network entity, for example, may be a 5G or NR NodeB (gNB). In a non-terrestrial system, in which signals have to travel to and from airborne or space-borne vehicles, RTT may not be negligible. In one example, involving a GEO bent-pipe satellite system, the RTT may be in the order of 600 milliseconds (ms), which may result in $N_{HARQ}$ values of greater than 600. Even when using a slot aggregation of 8, 75 HARQ processes, assuming 1 ms slots, may still be used.

The large number of HARQ processes may force that non-terrestrial receiver to have an immense memory capacity. A large number of HARQ processes may also lead to large signalling overhead. In addition, the frequency usage of HARQ may add a lot of jitter to the data link, which may cause some packets to experience an additional two-way propagation delay when HARQ retransmission is requested. In response to the large number of HARQ processes, certain embodiments may allow for dynamic or semi-static HARQ disabling.

In certain embodiments, the HARQ may be disabled or enabled based on at least one of a carrier, numerology, or a service when carrier aggregation may be supported in a non-terrestrial network. There may be a mapping between a logical channel, such as a radio bearer or a service, and a carrier, which may have certain numerology. Numerology, for example, may be the subcarrier spacing of the carrier. At least one logical channel may be transmitted on the carriers having the mapping numerologies. In some embodiments, the HARQ with certain numerologies may be disabled based on a quality of service (QoS) requirement of the service. For example, the HARQ may be disabled based on a reliability, a latency, and/or a jitter on the at least one logical channel. The disabling may be either carrier based or service based.

The disabling may be either dynamic or semi-static. For the carrier that utilizes semi-static HARQ disabling, for example, HARQ related signalling in downlink control information (DCI) may not be used.

In some embodiments, carrier aggregation may be supported in a non-terrestrial network. For example, there are three carriers, a first carrier C1, a second carrier C2, and a third carrier C3, and each carrier may be configured with different numerologies. For example, first carrier C1 may have a first numerology N1, second carrier C2 may have a second numerology N2, and third carrier C3 may have a third numerology N3. Certain embodiments may also have three kinds of services, S1, S2, and S3, where S1 may be mapped on logical channel 1 (LG1), where S2 may be mapped on logical channel 2 (LG2), and where S3 may be mapped on logical channel 3 (LG3). Based on the QoS requirement, the LG1 may be configured to transmit on C1 with N1, LG2 may be configured to transmit on C2 with N2 and LG3 may be configured to transmit on C3 with N3.

The HARQ on each carrier may be disabled or enabled separately. For example, when S1 has a loose reliability requirement, the HARQ on carrier 1 may be disabled. When S2 has strict delay, jitter, and/or reliability requirements, the HARQ on carrier 2 may be disabled. In addition, the work point on carrier 2 may be improved to guarantee a successful first transmission. When S3 has reliability requirements, as well as either delay and/or jitter requirements, the HARQ on carrier 3 may be enabled.

Dynamic and semi-static HARQ disabling may be performed together, in certain embodiments. For example, for carrier 3 to transmit S3, the HARQ dynamic disabling may be used based on a memory status of the user equipment and/or any other condition of the user equipment. Carriers 1 and 2, on the other hand, may experience semi-static HARQ disabling.

An HARQ Virtual Process Identification (ID), in certain embodiments, may be used instead of a HARQ Process ID, in certain embodiments. The HARQ Process ID may be based on the actual HARQ Process Number considering the round trip time, as well as any other processing or transmission delay. In some embodiments, the HARQ Virtual Process Number may be different from the actual HARQ Process Number, and may reduce the signalling bits for the HARQ process indication. For example, the HARQ Virtual Process Number may be smaller than the actual HARQ Process Number. The reduced HARQ Virtual Process Number may be achieved by restricting the timing of asynchronous HARQ transmissions. For example, if the first transmission occurs at T0, then the asynchronous HARQ retransmissions may only occur between the time from "T0+HARQ_process_number*Tsf" and "T0+HARQ_process_number*Tsf+HARQ_virtual_process_number*Tsf", where Tsf may represent a subframe duration. In other words, the asynchronous HARQ retransmissions may occur any time after "T0+HARQ_process_number*Tsf" and before "T0+HARQ_process_number*Tsf+HARQ_virtual_process_number*Tsf."

In addition to the HARQ Virtual Process ID, a virtual ID may also be maintained at the UE side and/or the network entity side. The network entity, for example, may be an enhanced Node B (eNB) or gNB. At the user equipment, for example, the Virtual ID of the data may be associated with HARQ Virtual Process ID #i and received at time $T_{j,i}$.

The Virtual ID may be determined using the following equation:

$$N_{V,j,i} = \left\lceil \frac{T_{j,i} - T_{0,i}}{N_{HARQ-V} * T_{sf}} \right\rceil, \text{ if } T_{j,i} - T_{0,i} < N_{HARQ} * Tsf \ (i, e, \text{one } RTT).$$

if $T_{j,i} - T_{0,i} < N_{HARQ}*Tsf$ (i, e, one RTT). $T_{0,i}$ may represent a time of receiving the transmission with HARQ Virtual Process ID #i and Virtual ID #0 within $N_{HARQ}*Tsf$, meaning within one RTT. $T_{j,i}$ may represent the time of receiving the transmission with HARQ Virtual Process ID #i and Virtual ID #j, Tsf may represent the subframe duration, $N_{HARQ-V}$ may represent the HARQ Virtual Process Number, while $N_{V,j,i}$ may represent the Virtual ID of the data receiving at $T_{1,j}$ with HARQ Virtual Process ID #i.

In certain embodiments, the HARQ Virtual Process ID and the Virtual ID may be used by the user equipment to link the correct mapping of the retransmission and the first transmission. In addition, the HARQ Virtual Process Number may be configured based on at least one of the overhead of the HARQ Virtual Process ID and/or the scheduling flexibility. The scheduling may be performed at the network entity, while the scheduling flexibility may be related to both the network entity and the user equipment. The HARQ Virtual Process ID may also be used to signal to the user equipment through the physical downlink control channel (PDCCH). In some other embodiments, the HARQ Virtual Process Number may be signalled to the user equipment via radio resource control (RRC) signalling. In other embodiments, the HARQ Virtual Process ID may be used for either downlink or uplink transmission.

Figure 1:
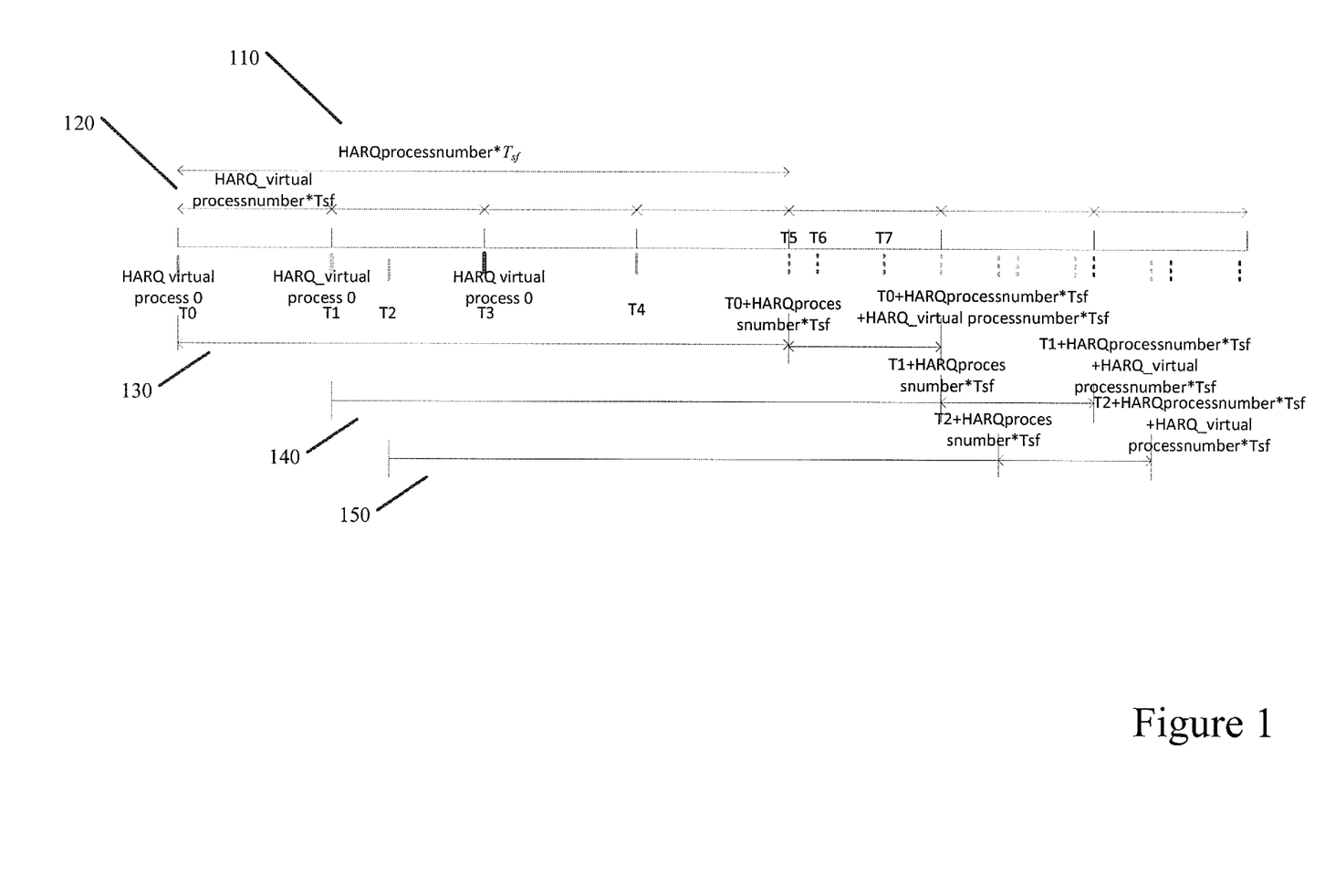
FIG. 1 illustrates an example of a diagram according to certain embodiments.

FIG. 1 illustrates an example of a diagram according to certain embodiments. In particular, FIG. 1 illustrates using an HARQ Virtual Process Number or Identification to reduce signalling overhead. As shown in FIG. 1, the first transmission may occur at T0, and the HARQ Virtual Process ID at T0 may be 0. In other words, the HARQ Virtual Process ID at T0 may be represented as HARQ Virtual Process ID #0. The first DCI indicating the first transmission of a physical downlink shared channel (PDSCH) or a physical uplink shared channel (PUSCH) may be received by the user equipment via a PDCCH. The UE may then receive DCI indicating another transmission at time T1, for example. The another transmission may correspond to an HARQ Virtual Process ID #0 at T1, and the user equipment may compare the timing difference of the first transmission and the another transmission having the same HARQ Virtual Process ID. The timing difference may be represented by T1-T0.

In some embodiments, the user equipment may compare the timing difference between the first transmission and the another transmission with round trip time (RTT). When T1-T0 is less than RTT, the user equipment may know that the network entity will not schedule the retransmission. The network entity, such as gNB, may only schedule the retransmission based on a negative acknowledgement (NACK) feedback received after the RTT. Any transmission received at the user equipment before the RTT expires, therefore, may not be a retransmission, even if the transmission includes HARQ Virtual Process ID #0. When the difference of the timing is less than the round trip time, the user equipment may process, decode, and/or buffer the data with HARQ Virtual Process ID #0 and Virtual ID #1.

Similarly, as shown in FIG. 1, at T2, T3 and T4 the timing difference (Ti-T0) is less than RTT, where i=2, 3, 4. The user equipment receiving a transmission at T2, T3, and T4, therefore, may know that the transmission is not a retransmission, even if the user equipment may receive the DCI with HARQ Virtual Process ID #0. When the difference of the first transmission and the another transmission is more than or equal to a round trip time, the DCI indicating retransmission may be received during a timing between T0+HARQ_process_number*Tsf and T0+HARQ_process_number*Tsf+HARQ_virtual process_number*Tsf. As shown in FIG. 1, when another transmission is received at either one of T5, T6, or T7, the user equipment may know that the another transmission is possibly a retransmission, since Ti-T0 is larger than or equal to RTT, where i=5, 6, 7. In the duration between T1+HARQ_process_number*Tsf and T1+HARQ_process_number*Tsf+HARQ_virtual_process_number*Tsf, the user equipment may know that the another transmission received in the duration may be a retransmission for HARQ Virtual Process ID #0 with a Virtual ID #0.

As described above, FIG. 1 illustrates HARQ_process_number*Tsf 110 and HARQ_virtual process number*Tsf 120. FIG. 1 also illustrates a duration represented by T0 to T0+HARQ_process_number*Tsf+HARQ_virtual process_number*Tsf 130. In addition, FIG. 1 illustrates a duration represented by T1+HARQ_process_number*Tsf+HARQ_virtual_process_number*Tsf 140, and a duration represented by T2+HARQ_process_number*Tsf+HARQ_virtual_process number*Tsf 150. When the another transmission is received between T0/T1/T2+HARQ_process_number*Tsf and T0/T1/T2+HARQ_process_number*Tsf+HARQ_virtual process_number*Tsf, the user equipment may designate the received transmission as an asynchronous HARQ transmission.

Certain embodiments may allow for dynamic HARQ disabling, which may decide on a packet-by-packet basis whether to receive the HARQ acknowledgement feedback or not. In such embodiments, the HARQ may be disabled for a period of time, thereby disabling the large number of signalling overhead related to the HARQ process identification. Semi-static HARQ disabling may, in some embodiments, be used to compliment dynamic HARQ disabling. The HARQ disabling may be user equipment based, and may not consider the different QoS requirements of different services.

Certain other embodiments may allow for reducing the HARQ process number. For both dynamic HARQ disabling and/or HARQ enabling, the HARQ process identification may be used to indicate to which HARQ process a given PDCCH belongs. The PDCCH may include the DCI for PDSCH and/or PUSCH. The large number of HARQ processes may utilize large signaling overheard for HARQ process identification. Certain embodiments described above, therefore, help to reduce the HARQ process number but using a HARQ virtual process identification.

Figure 2:
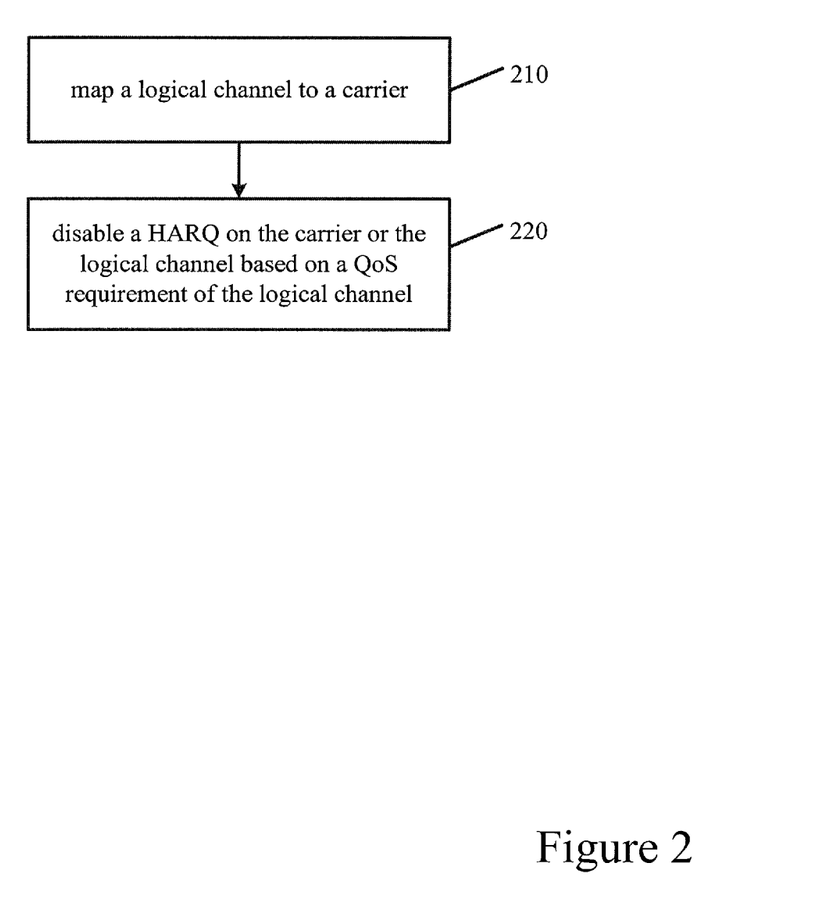
FIG. 2 illustrates an example of a flow diagram according to certain embodiments.

FIG. 2 illustrates an example of a flow diagram according to certain embodiments. In particular, FIG. 2 illustrates a method performed by a user equipment. In step 210, the user equipment may map a logical channel to a carrier. In step 220, the user equipment may disable a HARQ on the carrier or the logical channel based on a QoS requirement of the logical channel. The QoS requirement, for example, may comprise at least one of reliability, latency, and/or signal jitter. The disabling, in certain embodiments, may be a semi-static disabling.

Figure 3:
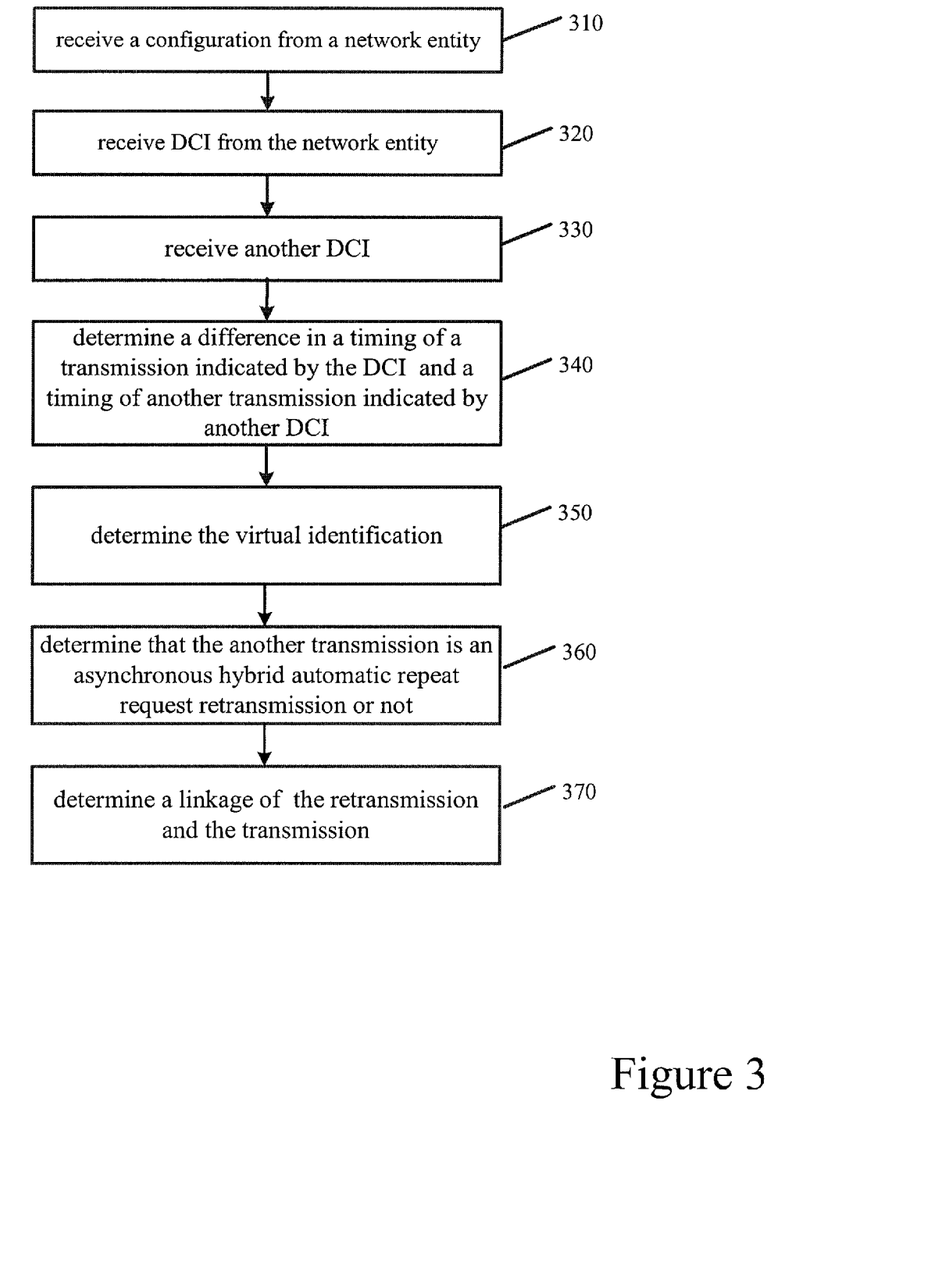
FIG. 3 illustrates an example of a flow diagram according to certain embodiments.

FIG. 3 illustrates an example of a flow diagram according to certain embodiments. In particular, FIG. 3 illustrates a method performed by a user equipment. In step 310, the user equipment may receive a configuration from a network entity. The configuration may comprises a HARQ virtual process number. The network entity, for example, may be a gNB or an eNB. In step 320, the user equipment may receive DCI from the network entity. The DCI may comprises a HARQ virtual process identification. In certain embodiments, the DCI may be related to at least one of the PDSCH or the PUSCH. In step 330, the user equipment may receive another DCI. The another DCI may comprise the HARQ virtual process identification. In certain embodiments, the user equipment may compare the HARQ process identification of the DCI and the HARQ virtual process identification of the another DCI. The HARQ virtual process identification may be the same as the another HARQ virtual process identification. In step 340, the user equipment may determine a difference in a timing of a transmission indicated by the DCI and a timing of another transmission indicated by another DCI. For example, the user equipment may determine T1−T0, as shown in FIG. 1.

In step 350, the user equipment may determine that the another transmission is an asynchronous HARQ retransmission or not based on the determined difference. In step 360, the user equipment may determine the virtual identification based on the determined difference and the configured HARQ virtual process number. In some embodiments, the virtual identification is determined based on a subframe duration. In step 370, the user equipment may determine a linkage of the retransmission and the transmission based on both the transmitted HARQ virtual process identification and the determined virtual identification.

In certain embodiments, the user equipment may determine that the difference of the timing is less than a round trip time. The another transmission may not be an asynchronous HARQ retransmission for the corresponding HARQ virtual process ID, when the difference of the timing is less than the round trip time. The user equipment may process the another transmission using the HARQ virtual process identification and virtual identification.

In other embodiments, the user equipment may determine that the difference of the timing is more than or equal to a round trip time. The another transmission may be an asynchronous HARQ retransmission when the difference of the timing is more than or equal to the round trip time. The user equipment may receive the asynchronous HARQ retransmission during a timing of a virtual process number. The configuration comprising the HARQ virtual process number is received via radio resource control signaling. As shown in FIG. 1, the timing of the virtual process number may be between T0+HARQ_process_number*Tsf and T0+HARQ_process_number*Tsf+HARQ virtual process_number*Tsf. The virtual identification may be maintained at the user equipment. In some embodiments, the DCI or the another DCI may be received via a non-terrestrial network.

Figure 4:
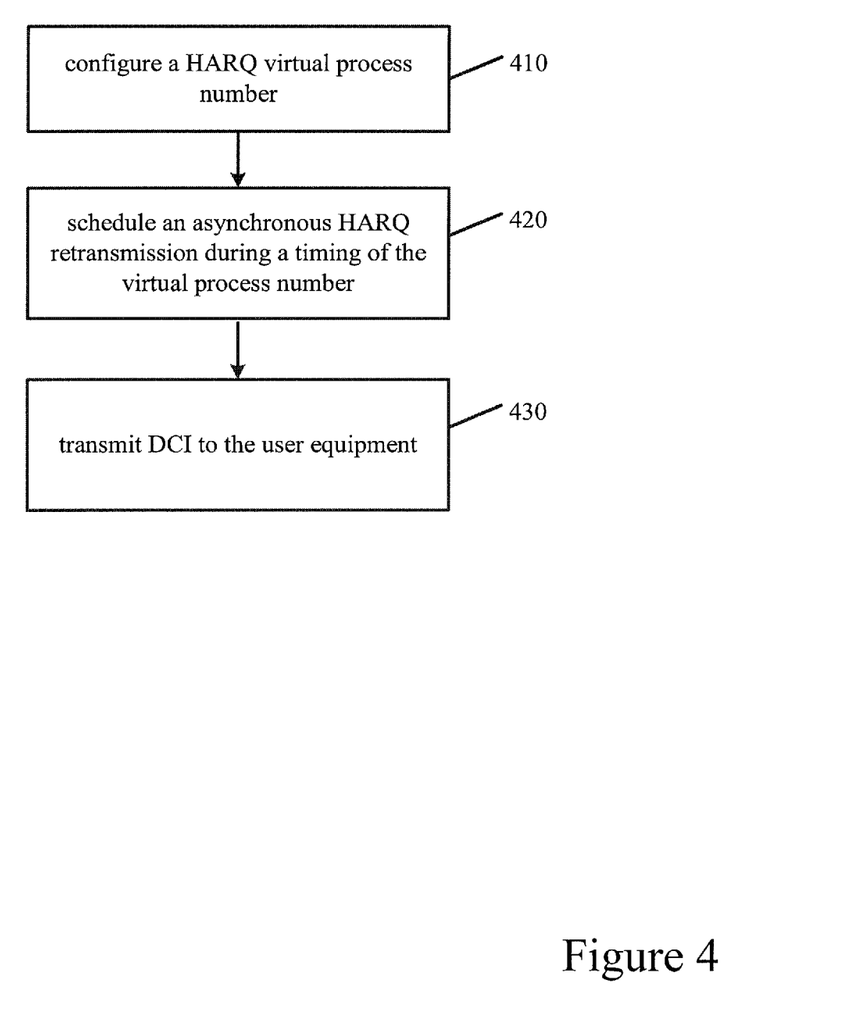
FIG. 4 illustrates an example of a flow diagram according to certain embodiments.

FIG. 4 illustrates a flow diagram according to certain embodiments. In particular, FIG. 4 illustrates a method performed by a network entity, such as a gNB. The network entity described in FIG. 4 may communicate with the user equipment described in FIG. 3. In step 410, the network entity may configure a HARQ virtual process number for a user equipment. In step 420, the network entity may schedule an asynchronous HARQ retransmission during a timing of the virtual process number. In step 430, the network entity may transmit DCI to the user equipment. The DCI may include a HARQ virtual process identification.

Figure 5:
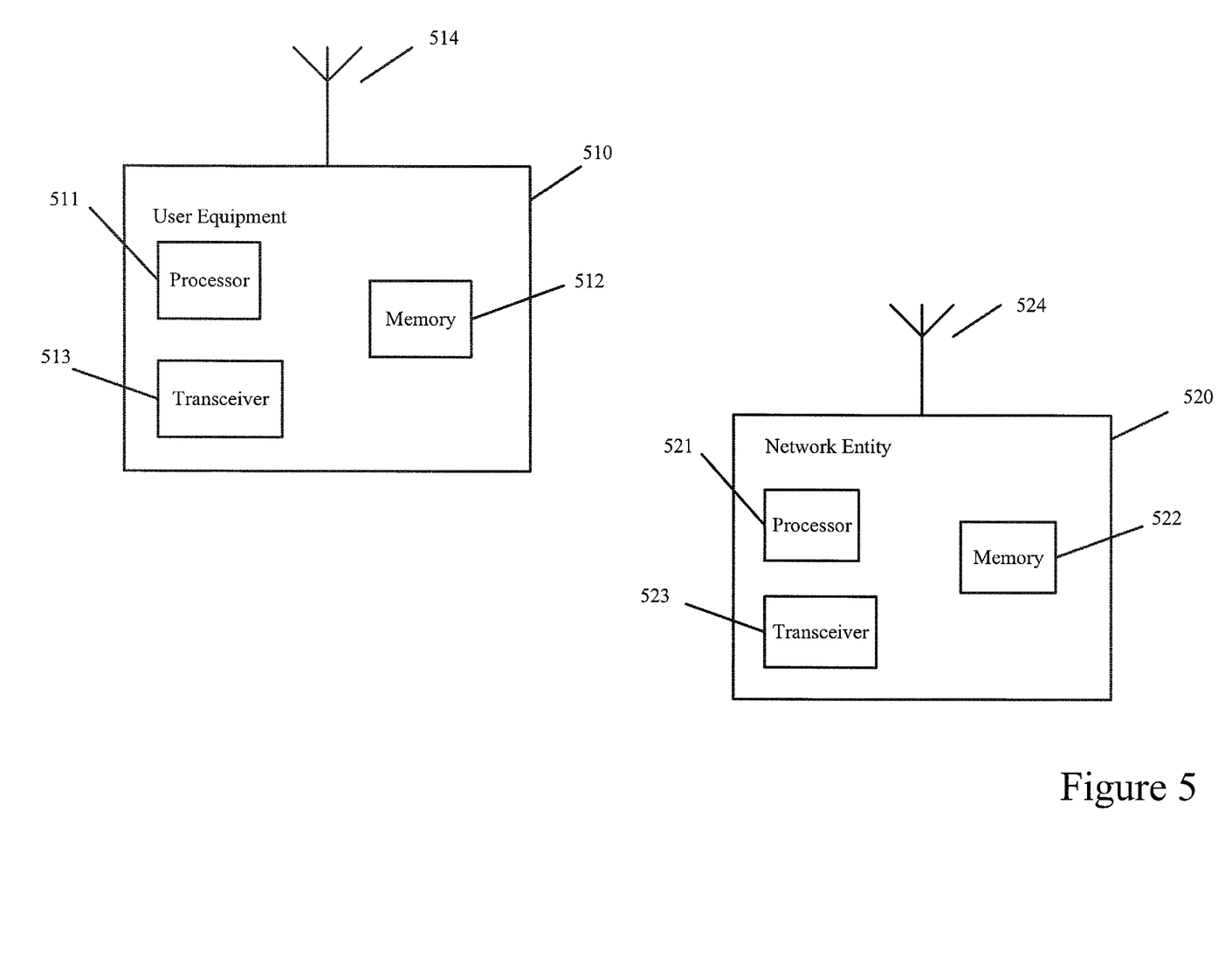
FIG. 5 illustrates an example of a system according to certain embodiments.

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, network entity 520 or user equipment (UE) 510. The system may include more than one UE 510 and more than one network entity 520. Network entity 520 may be a network node, a base station, an access point, an access node, a gNB, an eNB, a server, a host, or any other network entity that may communicate with the UE.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network entity deliver local content. One or more functionalities may also be implemented as virtual application(s) in software that can run on a server.

A user device or UE 510 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network entity, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable. Certain embodiments are directed to a computer program product embodied in a non-transitory computer-readable medium and encoding instructions that, when executed in hardware, perform a process.

The memory and the computer program instructions may be configured, with the processor for the particular device, to cause a hardware apparatus such as network entity 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-4. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The above embodiments may provide for significant improvements to the functioning of a network and/or to the functioning of the network entities within the network, or the user equipment communicating with the network. For example, the above embodiments may help to reduce the signaling overhead involved with HARQ. Doing so may help to reduce overall resource usage by the network, as well as the user equipment. This increases the efficiency of the network, and provides significant computer-related improvements.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G, NR, or LTE technology, the above embodiments may also apply to any other present or future 3GPP technology, such as LTE-advanced, fourth generation (4G) technology, or any other non-3GPP technology.

Partial Glossary eNB Enhanced Node B
PDCCH Physical Downlink Control Channel
PDSCH Physical Downlink Shared Channel
UE User Equipment
HARQ Hybrid Automatic Repeat Request
gNB 5G or NR NodeB
QoS Quality of Service
RRC Radio Resource Control
NACK Negative Acknowledgment

What is claimed is:

1. An apparatus comprising:
at least one processor; and
at least one non-transitory memory storing instructions that, when executed by the at least one processor, cause the apparatus at least to:
receive a configuration from a network entity, wherein the configuration comprises a hybrid automatic repeat request virtual process number, wherein the hybrid automatic repeat request virtual process number comprises fewer bits than a hybrid automatic repeat request process number, wherein the hybrid automatic repeat request virtual process number is used for a hybrid automatic repeat request process identification;
receive a downlink control information from the network entity, wherein the downlink control information comprises a hybrid automatic repeat request virtual process identification configured to identify a transmission indicated with the downlink control information;
receive another downlink control information, wherein the another downlink control information comprises another hybrid automatic repeat request virtual process identification configured to identify another transmission indicated with the another downlink control information; and
determine a difference between a timing of the transmission indicated with the downlink control information and another timing of the another transmission indicated with the another downlink control information.

2. The apparatus of claim 1, wherein the instructions, when executed by the at least one processor cause the apparatus at least to:
determine whether the another transmission is an asynchronous hybrid automatic repeat request retransmission or not based on the determined difference.

3. The apparatus of claim 1, wherein at least one of the downlink control information or the another downlink control information is related to at least one of a physical downlink shared channel or a physical uplink shared channel.

4. The apparatus of claim 1, wherein the instructions, when executed by the at least one processor, cause the apparatus at least to:
 determine that the difference between the timing of the transmission indicated with the downlink control information and the another timing of the another transmission indicated with the another downlink control information is more than or equal to a round trip time, and wherein the another transmission is an asynchronous hybrid automatic repeat request retransmission when the difference of the timing of the transmission indicated with the downlink control information is more than or equal to the round trip time.

5. The apparatus of claim 4, wherein the instructions, when executed by the at least one processor, cause the apparatus at least to:
 receive the asynchronous hybrid automatic repeat request retransmission during a timing defined at least partially with the hybrid automatic repeat request virtual process number.

6. The apparatus of claim 1, wherein the instructions, when executed by the at least one processor, cause the apparatus at least to:
 determine that the difference between the timing of the transmission indicated with the downlink control information and the another timing of the another transmission indicated with the another downlink control information is less than a round trip time, and wherein the another transmission is not an asynchronous hybrid automatic repeat request retransmission, when the difference between the timing of the transmission indicated with the downlink control information and the another timing of the another transmission indicated with the another downlink control information is less than the round trip time.

7. The apparatus of claim 1, wherein the instructions, when executed by the at least one processor, cause the apparatus at least to:
 determine a virtual identification based on the determined difference and the hybrid automatic repeat request virtual process number included in the received configuration.

8. The apparatus of claim 7, wherein the virtual identification is determined based on a subframe duration.

9. The apparatus of claim 7, wherein the virtual identification is maintained at the apparatus.

10. The apparatus of claim 7, wherein, when the another transmission is determined to be the asynchronous hybrid automatic repeat request retransmission, the at least one memory and the instructions are configured, with the at least one processor, to cause the apparatus at least to:
 determine a linkage of the retransmission and the transmission based on both the received hybrid automatic repeat request virtual process identification and the determined virtual identification.

11. The apparatus of claim 7, wherein, when the another transmission is determined not to be an asynchronous hybrid automatic repeat request retransmission, the instructions, when executed by the at least one processor, cause the apparatus at least to:
 process the another transmission using the another hybrid automatic repeat request virtual process identification and the determined virtual identification.

12. The apparatus of claim 1, wherein the configuration comprising the hybrid automatic repeat request virtual process number is received via radio resource control signaling.

13. The apparatus of claim 1, wherein the instructions, when executed by the at least one processor, cause the apparatus at least to:
 compare the hybrid automatic repeat request virtual process identification configured to identify the transmission indicated with the downlink control information and the another hybrid automatic repeat request virtual process identification configured to identify the another transmission indicated with the another downlink control information.

14. The apparatus of claim 1, wherein the downlink control information or the another downlink control information are received via a non-terrestrial network.

15. An apparatus comprising:
 at least one processor; and
 at least one non-transitory memory storing instructions that, when executed by the at least one processor, cause the apparatus at least to:
 configure a hybrid automatic repeat request virtual process number for a user equipment;
 schedule an asynchronous hybrid automatic repeat request retransmission during a timing defined at least partially with the hybrid automatic repeat request virtual process number; and
 transmit downlink control information to the user equipment, wherein the downlink control information comprises a hybrid automatic repeat request virtual process identification configured to identify the asynchronous hybrid automatic repeat request retransmission.

16. The apparatus of claim 15, wherein the downlink control information is related to at least one of a physical downlink shared channel or a physical uplink shared channel.

17. The apparatus of claim 15, wherein the configuration comprising the hybrid automatic repeat request virtual process number is transmitted via radio resource control signaling.

18. The apparatus of claim 15, wherein the downlink control information is transmitted via a non-terrestrial network.

19. An apparatus comprising:
 at least one processor; and
 at least one non-transitory memory storing instructions that, when executed by the at least one processor, cause the apparatus at least to:
 map a logical channel to a carrier; and
 disable a hybrid automatic repeat request on the carrier or the logical channel based on a quality of service requirement of the logical channel.

20. The apparatus of claim 19, wherein the quality of service requirement comprises at least one of reliability, latency, or signal jitter.

* * * * *